United States Patent [19]

Smith

[11] 4,447,848

[45] May 8, 1984

[54] TELEPHONE SURGE PROTECTOR AND HOUSINGS THEREFOR

[75] Inventor: Thomas J. Smith, Bay Shore, N.Y.

[73] Assignee: TII Industries Inc., Copiague, N.Y.

[21] Appl. No.: 376,703

[22] Filed: May 10, 1982

[51] Int. Cl.³ .............................................. H02H 9/06

[52] U.S. Cl. .................................... 361/124; 361/119; 361/120; 337/34; 313/325

[58] Field of Search ............... 361/119, 120, 117, 124, 361/118; 313/325; 337/31, 33, 34

[56] References Cited

U.S. PATENT DOCUMENTS

| | | | |
|---|---|---|---|
| 2,600,407 | 6/1952 | Kelsay | 361/124 X |
| 2,896,128 | 7/1959 | Fuller et al. | 361/124 X |
| 3,993,933 | 11/1976 | Menninga | 361/124 |
| 4,333,121 | 6/1982 | Schwarz | 361/119 X |

*Primary Examiner*—Patrick R. Salce
*Attorney, Agent, or Firm*—Martin Sachs

[57] ABSTRACT

An overvoltage surge protector and housing for telephone communication lines to protect equipment connected thereto includes an insulated housing having one terminal disposed therein which is adapted to be connected to earth ground and a second terminal disposed in a removable assembly which includes the means for connection to the communication line as an integral part thereof. The overvoltage surge protector device is adapted to be retained within the second terminal and, when removed for replacement by a service technician, requires that the communication line affixed to the terminal be removed from the terminal in order to remove the protector device, thus requiring the communication lines to be reconnected when the defective protective device is removed and/or replaced.

13 Claims, 6 Drawing Figures

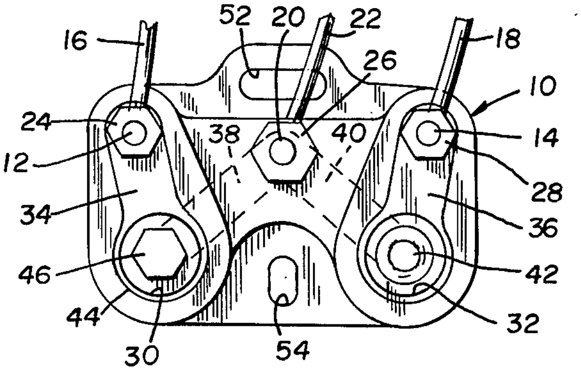
PRIOR ART
FIGURE I
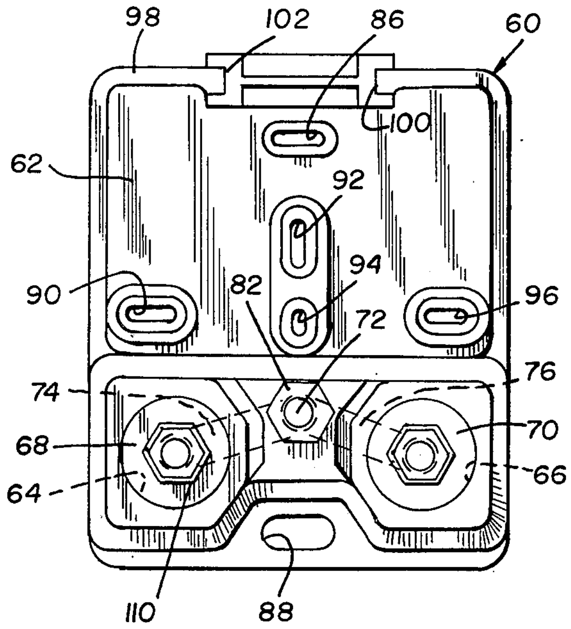
FIGURE 2
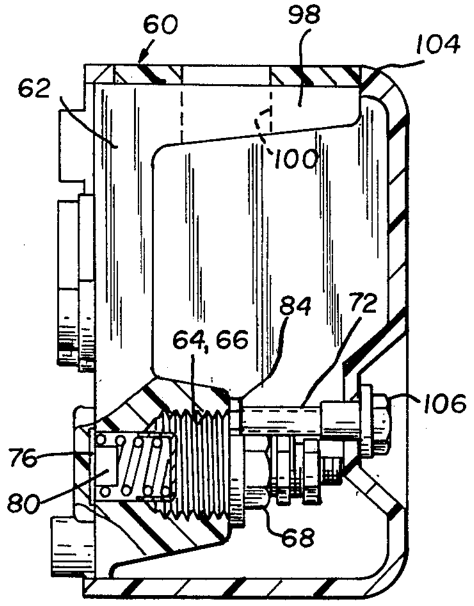
FIGURE 3

TELEPHONE SURGE PROTECTOR AND HOUSINGS THEREFOR

BACKGROUND OF THE INVENTION

1. Field of the Invention

The present invention relates to electrical overvoltage protector terminals and housings, sometimes referred to as electrical surge protectors or lightning arresters, used to protect telephone transmission lines against voltage surges, and more particularly, relates to an insulated housing configuration and protection terminal which requires that the telephone transmission lines be removed from the terminal when the overvoltage protector device is removed and/or replaced and requires reconnection of the lines when a new protector device is installed.

2. Description of the Relevant Art

Surge arresters or protection devices known in the prior art generally include a housing that contains a pair of spaced apart electrodes and a means for maintaining a protector cartridge between the electrodes. The protector cartridge may contain a pair of spaced apart carbon terminals or gas tubes that define an arc or a discharge gap therebetween in order to ground excessive line voltages for protecting both the equipment on the line and the line itself. With repeated overvoltage conditions and arc discharges, the carbon gap loses its effectiveness and the gas tube may also fail. Typical arresters, which may include fusing links and internal shorting mechanisms so that when an overvoltage occurs the fusing link melts providing a short from the line electrode to ground, are U.S. Pat. Nos. 4,128,855 issued to Gilberts on Dec. 5, 1979; Re. 29,391 issued to Kwiecki on Sept. 6, 1977; and 3,707,665 issued to Yereance, et al on Nov. 21, 1972.

All of these devices operate similarly, with each of them having a common shortcoming. By removal of the overvoltage protector device the line remains open, thereby providing no protection for the line or the equipment attached thereto. The communication line itself is not disturbed in order to remove the protector device. Therefore, if a service technician does not replace the defective protector device with a new unit, the telephone line will remain in operating order but will be unprotected for voltage transients.

It is well known that when a service technician dispatched to repair a shorted protector device, upon occasion not having a replacement device available, will return the protector cartridge without inserting the protector device therein. This condition could cause considerable damage should an overvoltage occur on the line, because there is no indication that the protector mechanism is missing. The terminal or line, when checked from the telephone line central office, will read "open" to ground and will indicate that the line is in good working order.

SUMMARY OF THE INVENTION

Therefore, it is an object of the present invention to provide a simple, inexpensive means for protecting telephone or other communication lines from overvoltage surges when the protector mechanism is removed therefrom.

It is yet another object of the present invention to provide a means for the central office to determine when a protector device has been removed from its receptacle in a protector housing.

It is a further object of the present invention to provide a means for the central office to determine that the protective cartridge and/or protector device has been removed from the terminal protector block until a new cartridge and protector device has been properly placed therein.

It is yet another object of the present invention to provide a serviceman with an incentive to replace a defective protective cartridge because he is required to reconnect the telephone communication line to maintain communications.

An overvoltage surge protector and housing, according to the principles of the present invention, for protecting communication lines and equipment connected thereto from voltage surges comprises a housing of insulating material having at least one well-type aperture disposed therein, includes a housing of insulating material having at least one well-type aperture disposed therein and a first terminal disposed therein adapted to be connected to earth ground. A first electrode portion is disposed at the closed end of the well-type aperture and has a generally centrally disposed upwardly extending portion. The first electrode is connected to the first terminal. A second terminal is remcvably received within the open end of each well-type aperture and has an integral second electrode portion and integral means for connection to one of the communication lines. The second terminal includes a protector device disposed therein in intimate contact with the first and second electrode portions.

The foregoing and other objects and advantages will appear from the description to follow. In the description reference is made to the accompanying drawing which forms a part hereof, and in which is shown by way of illustration, a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWING

In order that the invention may be more fully understood, it will now be described, by way of example, with reference to the accompanying drawing in which:

FIG. 1 is a top plan view of a prior art surge protector device and associated housing;

FIG. 2 is a top plan view of a surge protector device and housing, according to the principles of the instant invention;

FIG. 3 is a side view, in elevation, partially in cross-section, of the protector device and housing shown in FIG. 2;

DESCRIPTION OF THE PREFERRED EMBODIMENT

Figure 4:
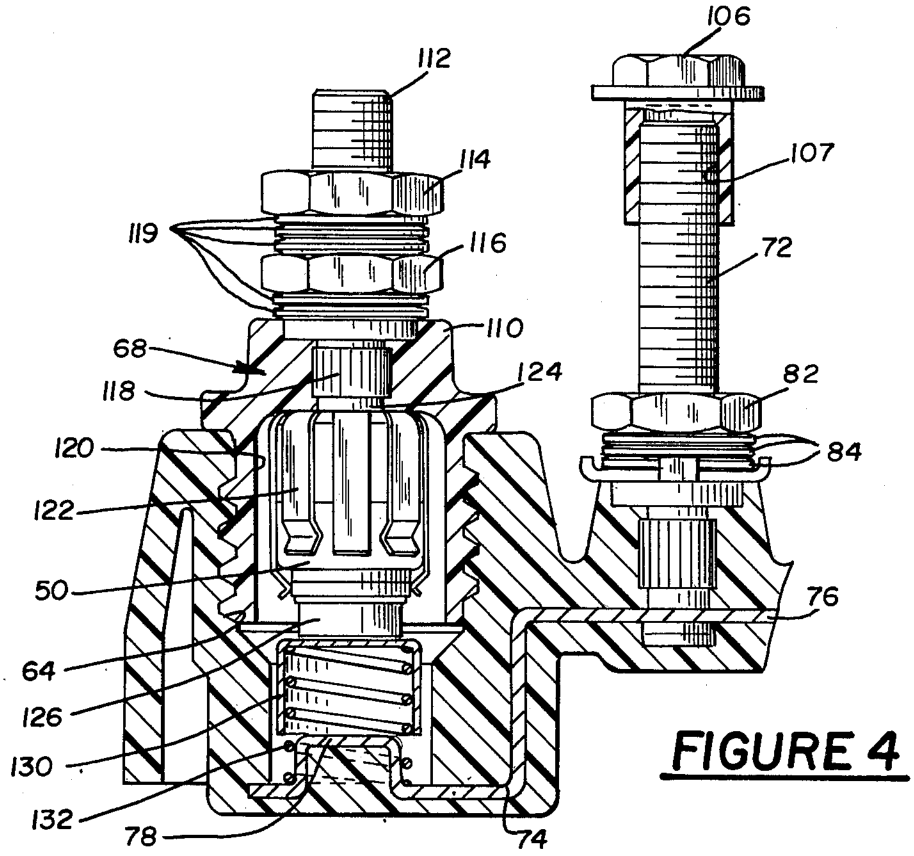
FIG. 4 is an enlarged, cross-sectional view showing one embodiment of a terminal assembly with a protector device in greater detail.

Referring now to the figures, and in particular to FIG. 1, which discloses a prior art surge protector housing 10. Included in the housing 10 are terminals 12 and 14 which are adapted to be connected to a pair of telephone communication lines 16 and 18, in a conventional manner, and a ground terminal 20 adapted to be connected to an earth ground, via a lead 22 affixed thereon. Generally, terminals 12, 14 and 20 are threaded and provided with nuts and washers 24, 26 and 28, respectively, which are utilized to retain the leads thereon in a conventional manner. A pair of well-type apertures 30 and 32 are provided in the housing 10 and each aperture is spaced away from the line terminals 12 and 14. A pair of connecting links 34 and 36 are disposed proximate the surface of the housing 10 and connect the terminals 12 and 14 to the apertures 30 and 32. An extending portion of the links 34 and 36 are threaded and are received into the apertures 30 and 32, thereby providing the upper portion of one electrode which may be connected to or in contact with a protective device.

A second pair of links 38 and 40 extend from the ground terminal 20 to each of the bottoms of the well-type apertures 30 and 32 and are provided with upwardly extending protrusions 42, thus forming the second electrode for connection to the protective device.

A hollow shell 44 having a nut-shaped upper portion 46 and a threaded lower portion, not shown, is adapted to be received into the apertures 30 and 32 and make electrical contact with the respective terminal links 34 and 36. A protective cartridge device, such at TII-44, manufactured by TII Industries, Inc., of Copiague, N.Y., may be inserted into the hollow shell 44 and makes electrical contact between the link 34, via the shell 44, and the ground terminal, via protrusion 42 and ground link 40. Mounting apertures 52 and 54 provide a convenient means to mount the telephone protector housing, in a conventional manner.

Referring now to FIGS. 2, 3, and 4 which show a telephone surge protector housing assembly 60, according to the principles of the present invention, that includes a body 62, preferably fabricated from an insulating material. The housing assembly 60 is provided with a pair of well-like apertures 64 and 66 which are adapted to threadedly receive therein a pair of terminal assemblies 68 and 70, respectively. Also provided in the body 62 is a ground terminal 72 which has outwardly extending links or arms 74 and 76 terminating in the well-type apertures 30 and 32. At the distal ends of links 74 and 76 upwardly extending protrusions 78 and 80 are provided to form the ground electrode connection. Preferably, the ground terminal 72 is integrally formed with the links 74 and 76 and the upwardly extending protrusions 78 and 80 forming the ground electrode. Ground terminal 72 is threaded and adapted to receive a nut 82 thereon together with a plurality of washers 84 to enable affixing of the ground lead 22 thereon, in a conventional manner.

Mounting apertures 86 and 88, as well as apertures 90, 92, 94 and 96, provide for mounting with various orientations, in a conventional manner.

The body 62 is also provided with an upwardly extending portion 98 which is provided with an aperture 100 adapted to receive a grommet 102 therein. A cover 104 may be utilized to completely enclose the housing assembly 60 providing moisture protection while permitting the leads 16, 18 and 22 to be inserted through the aperture 100 and be connected to their respective terminals. The cover 104 may be retained on the body 62 by means of a cover nut 106 which is provided with an internally threaded aperture 107 adapted to be received by the external threads provided on the ground terminal 72.

Referring particularly now to FIG. 4, which discloses the enlarged terminal assembly 68 inserted into the well-like aperture 64 of the body 62 of the housing assembly 60. Although one terminal assembly 68 is shown, it is understood that a pair of assemblies are required to complete the housing assembly 60 if a pair of telephone communication lines are to be protected and that any of the alternative embodiments may be utilized.

The terminal assembly 68 is preferably fabricated from an insulated material and is hexagonally shaped on the upper portion 110 and has molded therein an electrically conductive terminal 112 which is provided with an externally extended threaded portion for receiving cooperating nuts 114 and 116 and washers 119 suitable for affixment for telephone communication lines 16 or 18 thereon. The distal end 118 extends into receiving aperture 120 and has a metal cage affixed thereon, in a conventional manner, and functions as an electrode. A protective device 50, as explained earlier, is received into aperture 120 and retained therein with the aid of the metal cage 122. The distal ends 124 and 126 provide electrical conductive contact between the electrode 118, via clip 122 and via a cup-shaped ground contact 130 placed over a coil spring 132, which is in intimate contact with the upwardly extending protrusion 78 that functions as the ground electrode. The ground electrode 78 is connected by means of the link 74 to the ground terminal 72 which is conventionally affixed thereto as explained earlier. If the protector device 50 were to be removed from the cage 122 and the terminal assembly 68 inserted in the well-like aperture 64, the spring 132 would cause ground contact 130 to provide electrical continuity to cage 122 therefore shorting to ground any communication lines connected to the terminal 112.

Figure 5:
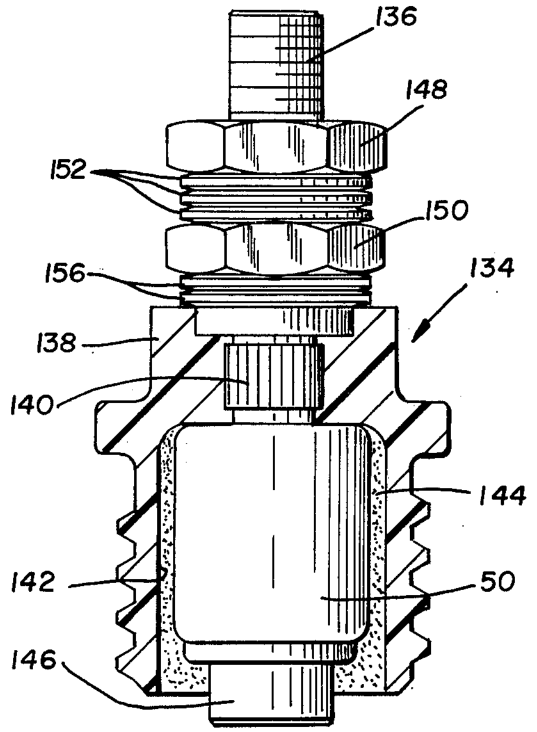
FIG. 5 is an alternative embodiment of a removable terminal assembly and protector device that is received by the housing.

Referring now to FIG. 5 which discloses an alternative embodiment 134 of terminal assembly 68. Included in the terminal assembly 134 is a metallic terminal 136 having a threaded portion extending outwardly from the insulated portion 138 with the distal end 140 extending into a receiving aperture 142 provided in the insulated portion 138 of the terminal assembly 134. The distal end 140 of terminal 136 functions as the electrode and is in intimate contact with the protective device 50 placed within the receiving aperture 142 and held in position by use of an epoxy 144 which encapsulates the protective device 50 and protects it from the environment. Thus, the electrode 140 is in permanent intimate contact with one end of protective device 50 and the other end 146 of protective device 50 will be in electrically conductive contact with ground contact 130 when inserted into well-like aperture 64 provided in the body 62 of the housing assembly 60. Nuts 148 and 150 and washers 152 and 156 cooperate with the terminal 136 to receive the telephone communication lines 16 or 18 thereon.

Figure 6:
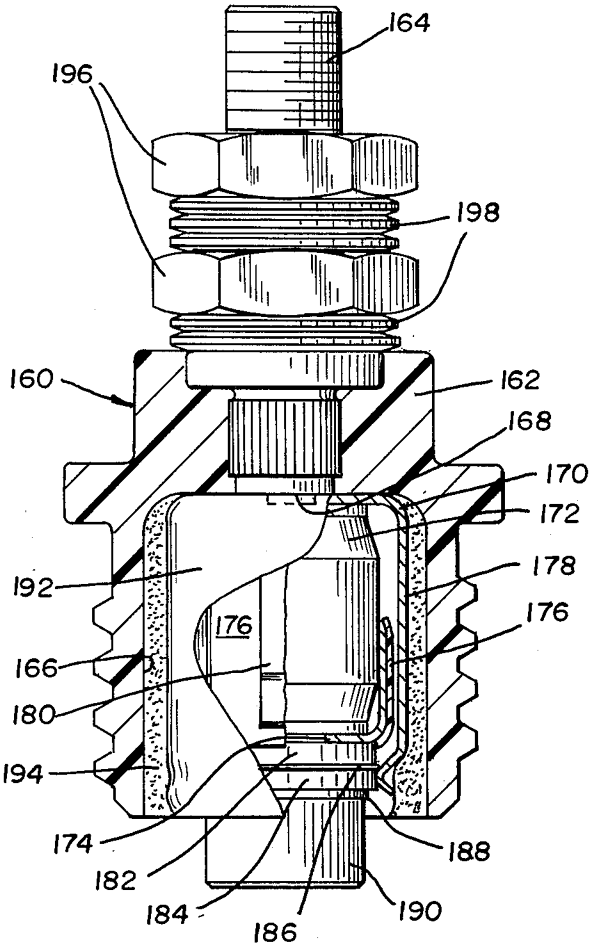
FIG. 6 is another alternative embodiment of a terminal assembly housing a protector device and an auxiliary protective gap.

In an alternative embodiment disclosed in FIG. 6, the terminal assembly 160 includes an insulated portion 162 and a threaded terminal 164. The terminal assembly 160 is provided with a receiving aperture 166 into which the distal end 168 of terminal 164 extends. A cage 170 is provided with an aperture and is received onto the distal end 168 of terminal 164. One end of protector device 172 is force fit onto the end 68, retaining the cage in intimate electrical contact with the terminal 164 and one electrode of the protector device 172. An end cap 174 is placed on the lower electrode of protector device 172 and is in intimate electrical contact therewith. A shrink-sleeve insulator 176 is placed about the lower portion of the protector device 172 to prevent the extending fingers 178 and 180, which alternate around the circumference of the protector device 172, from coming into contact with each other. A pair of graphite rings 182 and 184, having a mica spacer (air gap) 186 disposed therebetween, functions as an auxiliary protection device as will be explained hereinafter. A grommet 188 maintains a metal contact button 190 in position. A second shrink-sleeve insulation or protective wrap 192 protects the components described hereinbefore from coming into contact with the epoxy 194 used to encapsulate these components in the insulated portion 162 of the terminal assembly 160, thereby providing an environmentally (hermetically) sealed terminal assembly. As it is obvious, to those knowledgeable in the art, the graphite rings 182 and 184 with the mica spacer 186 disposed therebetween provide an auxiliary protective gap should the protector device 172 fail for any reason.

As described earlier, the threaded terminal 164 is provided with nuts 196 and washers 198 to permit the affixment of the communication lines 16 and 18 thereto, in a conventional manner.

In operation, the housing assembly is mounted, in a conventional manner, with the terminal assembly 68 inserted in the body 62, and the telephone lines and ground connection are made to the proper terminals. After a period of time, with the terminal having survived many overvoltage transients and lightning surges, the protector device 50 may become damaged and a technician would be dispatched to replace a defective protector cartridge 50 or a complete terminal assembly 134 or 160, which, more than likely, is providing an electrical conductive path between electrodes 118 and 78 shorting to ground the telephone communication line. In order for the technician to replace the protector cartridge 50 or the complete terminal assemblies 134 or 160, the telephone communication line 16 is required to be removed from the terminal 112, 136 or 164 to remove any of the terminal assemblies 68, 134 or 160 from the well-like aperture 64. If the technician should attempt to return the terminal assembly 68 into the well-like aperture 64 without replacing the defective protective device 50, the ground contact 130 shorts to the cage 122 thereby shorting out the telephone communication line 16 once it is replaced upon the terminal 112. If terminal assembly 134 or 160 required replacement, it would be necessary to replace the entire assembly since the protector device 50 is encapulated therein by epoxy. Assemblies 134 and 160 provide an environmentally sealed unit impervious to humidity, dirt, etc. found in the environment.

If the protector 50 or the entire assembly is not properly replaced a central office test operator will be able to detect a short or an open on the line and require that a service technician be dispatched again to correct the problem. Therefore, it is apparent that the present embodiments insures that the service technician sent to replace a defective protective device cannot leave the scene without inserting a suitable replacement device. With the configurations disclosed, the correction of a fault such as a short or an open on the telephone communication line, caused by a defective protector, may be assured.

Heretofore has been disclosed an inexpensive, simple, telephone surge protector housing which requires that a service technician called to repair a fault occurring at the terminal will replace the protector device in a proper manner and insure that the telephone communication line is properly protected for future transients.

Having thus set forth the nature of the invention, what is claimed is:

1. An overvoltage surge protector housing for protecting communication lines and equipment connected thereto from voltage surges comprising:

(a) a housing of insulating material having at least one well-type aperture disposed therein;

(b) a first terminal adapted to be connected to earth ground;

(c) a first electrode portion disposed at the closed end of said well-type aperture having a generally centrally disposed upwardly extending portion, said first electrode being connected to said first terminal, and (d) a second terminal removably received within the open end of said well-type aperture having a second electrode portion and means integral with said electrode portion for connection to one of said communication lines, said second terminal including protector means retained therein and adapted to be in intimate contact with said first and second electrode portions when disposed in said well-type aperture.

2. An overvoltage surge protector housing according to claim 1 wherein said second terminal is provided with an externally threaded portion for cooperating with internal threads provided proximate the open end of said well-type aperture.

3. An overvoltage surge protector housing according to claim 2 wherein said housing, said second terminal threaded portion and said internal threads of said well-type aperture are fabricated from an insulating material.

4. An overvoltage surge protector housing according to claim 1 wherein said protector means is a gas tube.

5. An overvoltage surge protector housing according to claims 1 or 3 wherein said protector means is readily replaceable in said second terminal.

6. An overvoltage surge protector housing according to claims 1 or 3 wherein said protector means is permanently affixed in said second terminal.

7. An overvoltage surge protector housing according to claim 1 wherein said means for connection to one of said communication lines is a threaded stud and cooperating nut for receiving said communication line for affixment thereon.

8. An overvoltage surge protector housing according to claim 1 wherein said first electrode portion includes an electrically conductive link extending to an externally disposed threaded stud having a cooperating nut thereon for receiving said earth ground connection.

9. An overvoltage surge protector housing according to claims 1, 2, 3, 4 or 8 wherein said second electrode portion and said means integral with said electrode portion for connecting to one of said communication lines are disposed in generally coaxial alignment with said first electrode extending portion.

10. An overvoltage surge protector housing according to claim 8 wherein said first electrode portion further includes spring means for insuring intimate contact between said first electrode and said protective means.

11. An overvoltage surge protector housing according to claim 10 wherein said spring means provides an electrically conductive path between said first electrode portion and said second electrode portion when said second terminal is inserted within said well-like aperture without a protective means being disposed therein.

12. An overvoltage surge protector according to claim 1 or 3 wherein said protector means is permanently affixed in said second terminal to provide an environmentally sealed assembly.

13. An overvoltage surge protector according to claim 1 wherein said protector means is removably held within said second terminal by means of a cage.

* * * * *